(12) United States Patent
Schlansker et al.

(10) Patent No.: US 9,170,377 B2
(45) Date of Patent: Oct. 27, 2015

(54) OPTICAL INTERCONNECT

(75) Inventors: Michael Schlansker, Los Altos, CA (US); Michael Renne Ty Tan, Menlo Park, CA (US); Shih-Yuan Wang, Palo Alto, CA (US); Wayne V. Sorin, Mountain View, CA (US); Jose Renato G. Santos, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/110,445

(22) PCT Filed: Jul. 18, 2011

(86) PCT No.: PCT/US2011/044335
§ 371 (c)(1),
(2), (4) Date: Oct. 8, 2013

(87) PCT Pub. No.: WO2013/012413
PCT Pub. Date: Jan. 24, 2013

(65) Prior Publication Data
US 2014/0029955 A1  Jan. 30, 2014

(51) Int. Cl.
*H04J 14/00* (2006.01)
*H04J 14/02* (2006.01)
(Continued)

(52) U.S. Cl.
CPC .......... *G02B 6/3514* (2013.01); *H04B 10/2503* (2013.01); *G02B 6/357* (2013.01); *G02B 6/3546* (2013.01); *G02B 6/3596* (2013.01)

(58) Field of Classification Search
CPC .......... H04Q 11/0001; H04Q 11/0003; H04Q 2011/0001; H04Q 2011/0007; H04Q 2011/0009; H04Q 2011/0015; H04Q 2011/0024; H04Q 2011/003; H04Q 2011/0052; H04J 2203/0007; H04J 2203/0012; G02B 6/357; G02B 6/3546; G02B 6/3596
USPC .......... 398/45, 48, 55, 82, 86, 141
See application file for complete search history.

(56) References Cited

U.S. PATENT DOCUMENTS 6,434,288 B1 * 8/2002 Uemura et al. ............. 385/16
6,542,268 B1   4/2003 Rotolo et al.
(Continued)

FOREIGN PATENT DOCUMENTS

EP    1245976 A1    10/2002
JP    2009033226 A   2/2009

OTHER PUBLICATIONS

English translation (machine-generated) of Abstract from Japanese Patent Publication No. 2009033226A [retrieved on Oct. 2, 2013], Retrieved from the Internet: <http://worldwide.espacenet.com/publicationDetails/biblio?DB=worldwide.espacenet.com&II=O&ND=3&adjacent=true&locale=en_EP&FT=D&date=20090212&CC=JP&NR=2009033226A&KC=A>.
(Continued)

*Primary Examiner* — Dalzid Singh
(74) *Attorney, Agent, or Firm* — Van Cott, Bagley, Cornwall & McCarthy

(57) ABSTRACT

An optical interconnect (200) includes: a reflective body (230) having a first reflective surface (235) and a second reflective surface (240) opposite the first reflective surface (235); a first optical waveguide (205) that directs a first optical signal received from a first communicating device (105) to the first reflective surface (235); a second optical waveguide (210) that directs the first optical signal from the first reflective surface (235) of the reflective body (230) to a second communicating device (110); a third optical waveguide (215) that directs a second optical signal received from the second communicating device (110) to the second reflective surface (240) of the reflective body (230); and a fourth optical waveguide (220) that directs the second optical signal from the second reflective surface (240) of the reflective body (230) to the first communicating device (105).

20 Claims, 8 Drawing Sheets

(51) Int. Cl.
*G02B 6/35* (2006.01)
*H04B 10/25* (2013.01)

(56) References Cited

U.S. PATENT DOCUMENTS

| | | |
|---|---|---|
| 6,890,619 B2 | 5/2005 | Troll |
| 6,928,244 B1 * | 8/2005 | Goldstein et al. ............... 398/45 |
| 2002/0021859 A1 * | 2/2002 | Briggs ............................ 385/17 |
| 2002/0106834 A1 | 8/2002 | Chiu et al. |
| 2003/0048982 A1 * | 3/2003 | Wu et al. ........................ 385/18 |
| 2003/0185493 A1 | 10/2003 | Akashi et al. |
| 2003/0210854 A1 * | 11/2003 | Tu .................................. 385/18 |
| 2004/0091202 A1 | 5/2004 | Ji et al. |
| 2008/0175534 A1 | 7/2008 | Fan et al. |

OTHER PUBLICATIONS

International Search Report & Written Opinion, Feb. 29, 2012. PCT Application No. PCT/US2011/044335.
International Preliminary Report on Patentability, Jan. 30, 2014, PCT Application No. PCT/US2011/044335.
Extended European Search Report received in EP Application No. 11869560.0, Feb. 26, 2015, 7 pages.

* cited by examiner

OPTICAL INTERCONNECT

BACKGROUND

Light beams or optical signals are frequently used to transmit digital data. For example, modulated optical signals can carry data between electronic components on circuit boards or through fiber optic networks.

Consequently, optical technology plays a significant role in modern telecommunications and data communication. Examples of optical components used in such systems include optical or light sources such as light emitting diodes and lasers, waveguides, fiber optics, lenses and other optics, photo-detectors and other optical sensors, optically-sensitive semiconductors, optical modulators, and the like.

Systems making use of optical components often rely upon the precise manipulation of optical energy, such as a beam of light, to accomplish a desired task. This is especially true in systems utilizing light for high-speed, low-energy communication between two nodes. Optical waveguides can be used to route modulated optical beams along a predetermined path. An optical waveguide is typically able to transmit optical beams received at a first end of the waveguide to a second end with minimal loss using the inherent physical characteristics of the optical waveguide material.

BRIEF DESCRIPTION OF THE DRAWINGS

The accompanying drawings illustrate various examples of the principles described herein and are a part of the specification. The illustrated examples are merely examples and do not limit the scope of the disclosure.

Throughout the drawings, identical reference numbers may designate similar, but not necessarily identical, elements.

DETAILED DESCRIPTION

Figure 1:
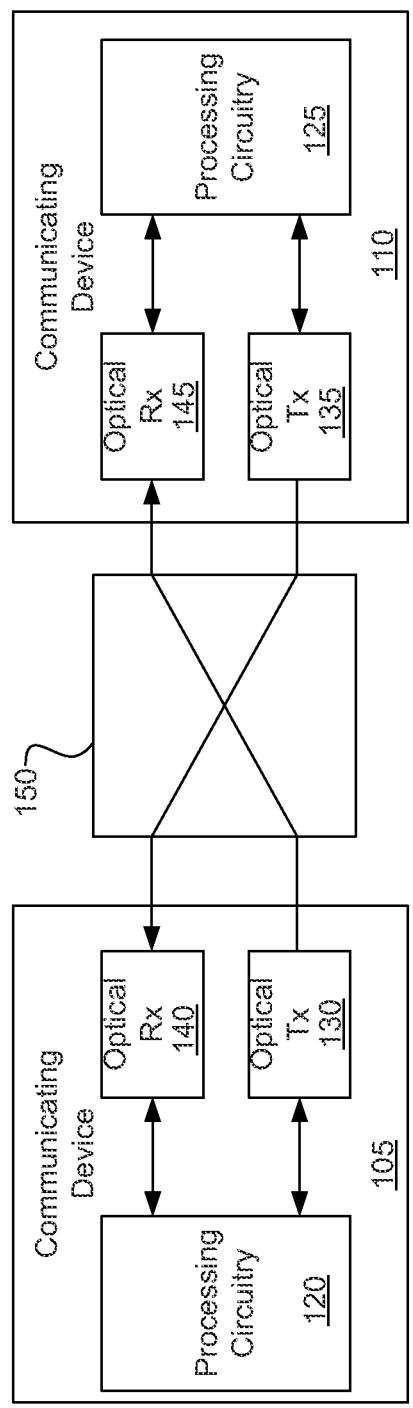
FIG. 1 is a block diagram of an illustrative system in which a first communicating device communicates with a second communicating device over an illustrative optical interconnect, according to one example of principles described herein.

In some cases, it may be desirable to establish bidirectional optical communication between two components, such as electronic devices. Furthermore, it may be useful under certain conditions to implement a switching functionality to allow for the selective enablement of bidirectional communication between the two components and/or establish bidirectional optical communication between two devices selected from a group of devices. It may also be desirable to accomplish these goals using an optical interconnect that uses board space more efficiently than previous optical interconnects.

In response to these and other considerations, the present specification discloses illustrative optical interconnects, systems, and methods for establishing bidirectional optical communication between two devices.

In one illustrative, non-exclusive example, an optical interconnect includes a reflective body having a first reflective surface and a second reflective surface opposite the first reflective surface. A first optical waveguide directs a first optical signal received from a first communicating device to the first reflective surface of the reflective body. A second optical waveguide directs the first optical signal from the first reflective surface of the reflective body to a second communicating device. A third optical waveguide directs a second optical signal received from the second communicating device to the second reflective surface of the reflective body, and a fourth optical waveguide directs the second optical signal from the second reflective surface of the reflective body to the first communicating device.

In another illustrative, non-exclusive example, an optical interconnect includes a plurality of optically conductive rows formed by a first plurality of optical waveguides, a plurality of optically conductive columns formed by a second plurality of optical waveguides, and a controller. The optically conductive rows form a plurality of intersecting optical paths with the plurality of optically conductive columns. The controller establishes bidirectional optical communication between a first device optically coupled to a first end and a second end of a first optically conductive row with a second device optically coupled to a first end and a second end of a first optically conductive column. This communication is established by selectively moving a reflective body disposed at an intersection of the first optically conductive column and the first optically conductive row.

In another illustrative, non-exclusive example, an illustrative method of establishing bidirectional optical communication between a first device and a second device includes: coupling the first device and the second device to an optical interconnect having a reflective body; and selectively actuating the reflective body such that a) a first optical signal transmitted from the first device is reflected from a first side of the reflective body to a receiver of the second device, and b) a second optical signal transmitted from the second device is reflected from a second side of the reflective body to a receiver of the first device.

As used in the present specification and in the appended claims, the term "reflective" refers to the physical property of a body in that at least one surface of that body prevents the passage of electromagnetic radiation (e.g., light) incident to that surface and causes the incidental electromagnetic radiation to change a direction of propagation.

As used in the present specification and in the appended claims, the term "optical waveguide" refers to a structure which transmits an optical electromagnetic wave received at a first end of the structure to a second end of the structure with minimal loss.

As used in the present specification and in the appended claims, the term "end," when referring to an optical waveguide, refers to an extremity of the optical waveguide configured to receive optical energy into the optical waveguide and/or emit optical energy from the optical waveguide.

As used in the present specification and in the appended claims, the terms "row" and "column" refer to groups of substantially parallel lines, where a first group of substantially parallel lines (the "rows") intersects with a second group of substantially parallel lines (the "columns"). As defined herein, rows and columns may be, but are not required to be, orthogonal to each other.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with that example is included as described, but may not be included in other examples.

The principles disclosed herein will now be discussed with respect to illustrative optical interconnects, systems, and methods related to the establishment of bidirectional optical communication between devices. In particular, the illustrative optical interconnects and related systems and methods disclosed in the present specification reduce the amount of space occupied on a board to establish bidirectional optical communication, thereby increasing the space efficiency of the optical interconnects. This increased space efficiency may provide the benefit of reduced manufacturing costs, reduced power consumption, and improved transmission efficiency.

FIG. 1 is a diagram illustrating the basic functionality of an optical interconnect establishing bidirectional optical communication between a first communicating device (105) and a second communicating device (110). Each of the communicating devices (105, 110) of the present example is an electronic device that includes processing circuitry (120, 125) for performing application-specific and/or general purpose processing functionality.

In connection with this processing functionality, the communicating devices (105, 110) communicate with each other optically. To this end, each of the communicating devices (105, 110) includes an optical transmitter (130, 135) for modulating digital data onto an optical signal output from the communicating device (105, 110) and an optical receiver (140, 145) for receiving and decoding modulated digital data on an optical signal received at the communicating device (105, 110).

An optical interconnect (150) is disposed intermediate the first and second communicating devices (105, 110) to establish bidirectional optical communication between the first and second communicating devices (105, 110). Specifically, the optical interconnect (150) optically couples the optical transmitter (130) of the first communicating device (105) to the optical receiver (145) of the second communicating device (110). Additionally, the optical interconnect (150) optically couples the optical transmitter (135) of the second communicating device (110) to the optical receiver (140) of the first communicating device (105). Under this configuration, a modulated optical beam emitted from the optical transmitter (130) of the first communicating device (105) is received by the optical receiver (145) of the second communicating device (110), and a modulated optical beam emitted from the optical transmitter (135) of the second communicating device (110) is received by the optical receiver (140) of the first communicating device.

Figure 2:
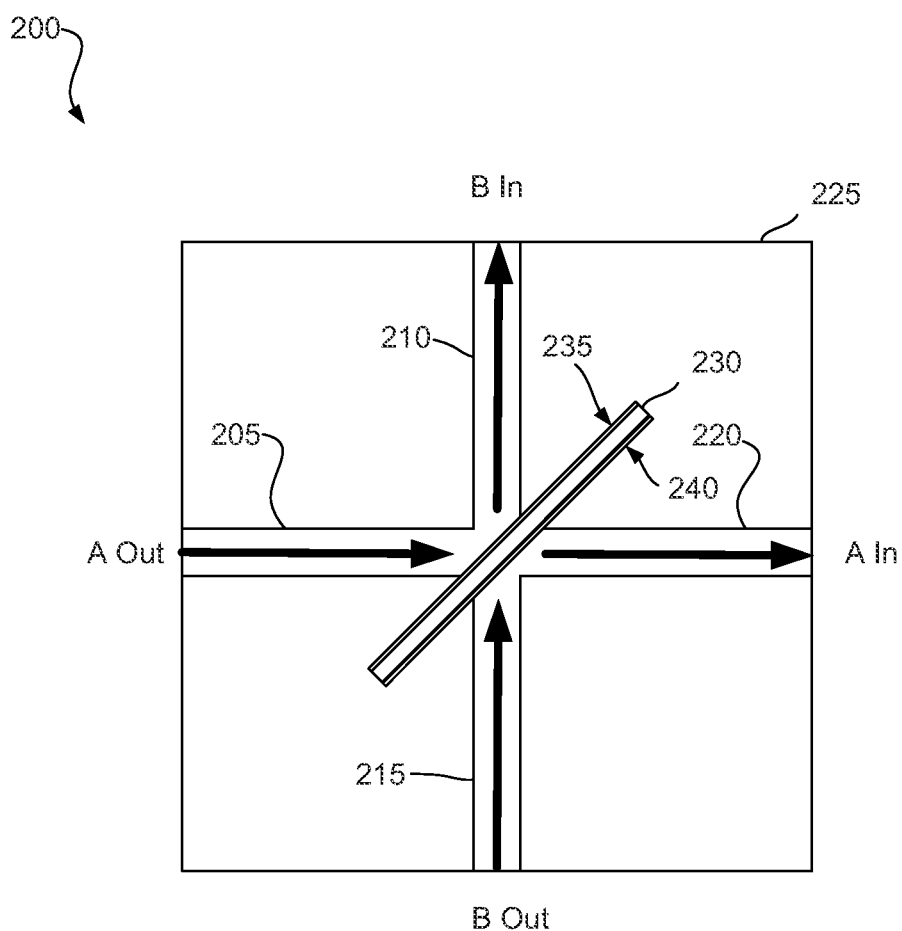
FIG. 2 is a top view diagram of an illustrative optical interconnect, according to one example of principles described herein.

FIG. 2 is a diagram of an illustrative optical interconnect (200) for implementing the functionality described with respect to FIG. 1. The optical interconnect (200) includes a first optical waveguide (205), a second optical waveguide (210), a third optical waveguide (215), and a fourth optical waveguide (220). As shown in FIG. 2, the optical waveguides (205, 210, 215, 220) may be arranged at right angles such that the first optical waveguide (205) is substantially aligned with the fourth optical waveguide (220) and the second optical waveguide (210) is substantially aligned with the third optical waveguide (215).

As shown in FIG. 2, the optical waveguides (205, 210, 215, 220) may be hollow metal waveguides disposed on a silicon substrate (225). Alternatively, the optical waveguides (205, 210, 215, 220) may be solid semiconductor bodies disposed on a substrate, or any combination of hollow and solid metal and/or semiconductor bodies.

The optical interconnect further includes a reflective body (230) disposed obliquely to the first, second, third, and fourth optical waveguides (205, 210, 215, 220). The reflective body may include a first reflective surface (235) and a second reflective surface (240), the reflective surfaces (235, 240) being on opposite sides of the reflective body (230). In certain examples, the reflective body (230) may be formed from a semiconductor body, with metallic or other reflective coatings to form the reflective surfaces.

The reflective body (230) is positioned with the first reflective surface (235) facing the first and second optical waveguides (205, 210) such that an optical beam emitted by the first optical waveguide (205) is reflected off of the first reflective surface (235) of the reflective body (230) into the second optical waveguide (210) (as indicated by the arrows). Furthermore, the second reflective surface (240) faces the third and fourth optical waveguides (215, 220) such that an optical beam emitted by the third optical waveguide (215) is reflected off of the second reflective surface (240) of the reflective body (230) into the fourth optical waveguide (220) (as indicated by the arrows).

In this way, bidirectional optical communication between two devices can be established by coupling the output of an optical transmitter of a first device to the node labeled "A Out," the input of an optical receiver of the second device to the node labeled "B In," the output of an optical transmitter of the second device to the node labeled "B Out," and the input of an optical receiver of the first device to the node labeled "A In."

Typical optical interconnects used in the art rely on a separate mirror to implement each path of optical communication. By contrast, the optical interconnect (200) of FIG. 2 uses a single double-sided mirror to interconnect two separate; simultaneously active paths of optical communication, thereby reducing by half the amount of space dedicated to providing two-way optical communication.

In certain examples, the reflective body (230) may be selectively moved into and out of the position shown in FIG. 2. For example, the reflective body (230) may be mechanically coupled to a microelectromechanical system (MEMS) actuator fabricated on the substrate (225) such that an electrical signal controls whether the reflective body (230) is in the position shown in FIG. 2 and described above. Additionally, one or more MEMS actuators may, for example, adjust the angle of the reflective body (230) in any dimension with respect to the optical waveguides (205, 210, 215, 220) to achieve optimal optical performance. In certain examples such adjustments may be made automatically in response to feedback from optical receivers coupled to the second and fourth optical waveguides (210, 220). Additionally or alternatively, these adjustments may be made manually by a user through a control interface.

Figure 3A:
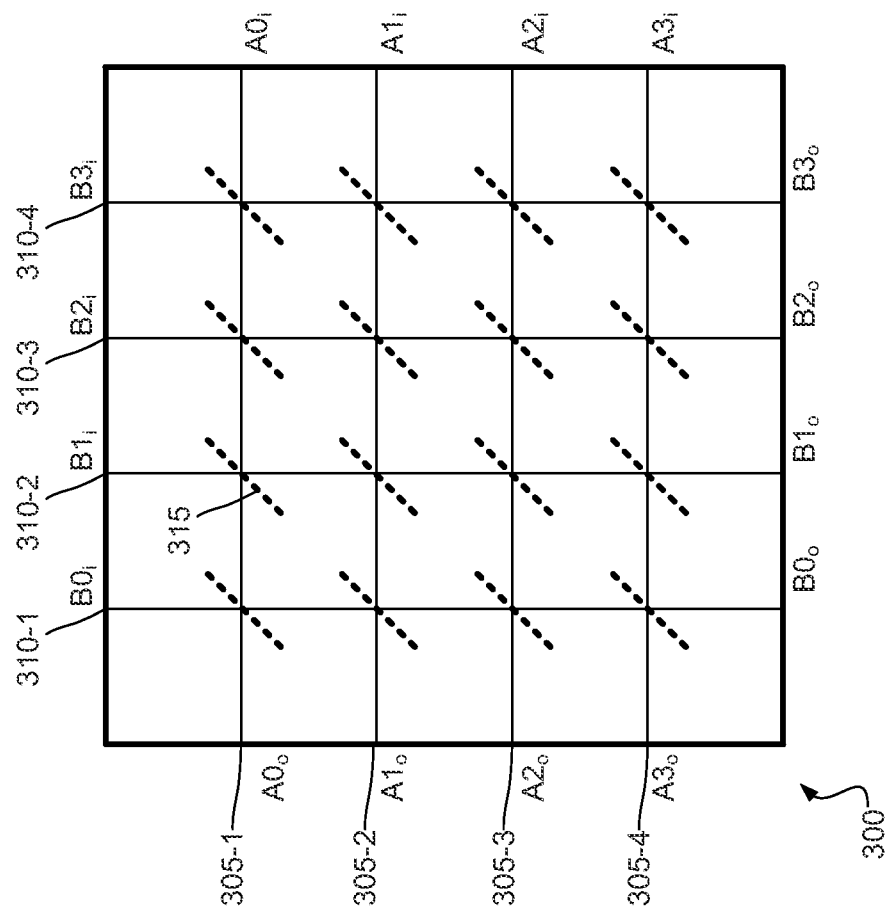
FIG. 3A is a diagram of an illustrative optical interconnect, according to one example of principles described herein.
Figure 3B:
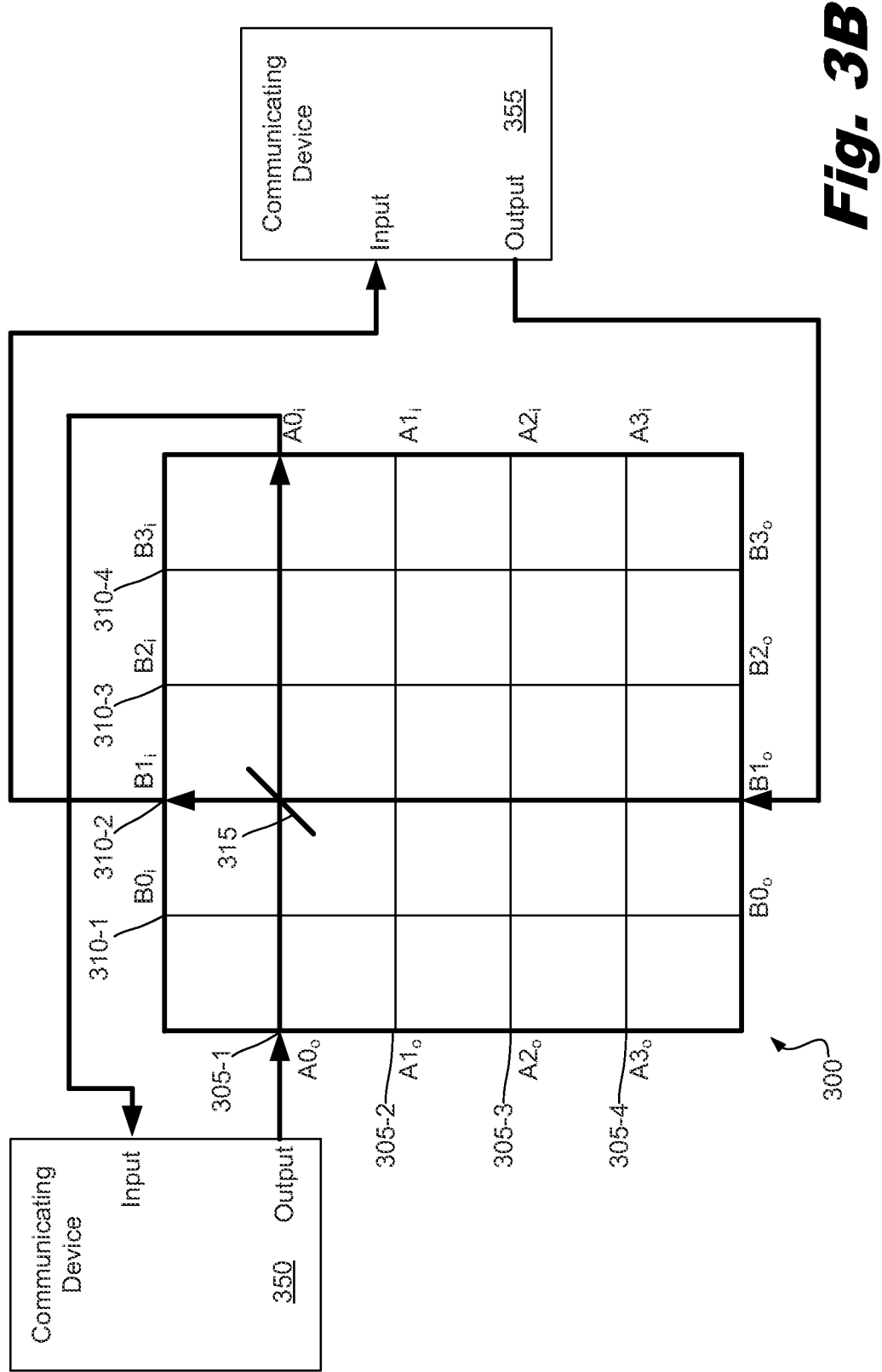
FIG. 3B is a diagram of a first illustrative communicating device communicating with a second illustrative communicating device using the optical interconnect of FIG. 3A, according to one example of principles described herein.

FIGS. 3A and 3B show an illustrative optical interconnect (300) in a crossbar configuration. The illustrative optical interconnect (300) includes a plurality of optically conductive rows (305-1 to 305-4) and a plurality of optically conductive columns (310-1 to 310-4). The optically conductive rows (305-1 to 305-4) and the optically conductive columns (310-1 to 310-4) are formed from first and second pluralities of optical waveguides. The optically conductive rows (305-1 to 305-4) are perpendicular to, and intersect with, the optically conductive columns (310-1 to 310-4). A separate reflective body (315) is disposed at each intersection of an optically conductive row (305-1 to 305-4) with an optically conductive column (310-1 to 310-4). Each reflective body (315) has a first reflective surface and a second reflective surface, and is positioned such that each intersection resembles and behaves like the optical interconnect (200) of FIG. 2.

The optical interconnect (300) may be associated with one or more communicating devices (350, 355). Each such device may be associated with a separate optically conductive row (305-1 to 305-4) or optically conductive column (310-1 to 310-4). Each such device may have an optical transmitter coupled to an output end of its respective row or column, and an optical receiver coupled to an input end of its respective row or column. For example, as shown in FIG. 3B, a device (350) associated with a first optically conductive row (305-1) may have an optical transmitter coupled to the "A0$_o$" end of the first optically conductive row (305-1) and an optical receiver coupled to the "A0$_i$" end of the first optically conductive row (305-1). Similarly, a second device (355) associated with the second optically conductive column (310-2) may have an optical transmitter coupled to the "B1$_o$" end of the second optically conductive column (310-2) and an optical receiver coupled to the "B1$_i$" end of the second optically conductive column (310-2).

Additionally, each of the reflective bodies (315) may be selectively moved into and out of the position described with respect to FIG. 2. In this way, bidirectional optical communication may be established between the respective devices associated with any row and column of the interconnect (300) simply by selectively moving the reflective body (315) at the intersection of that particular row and column into the position described with respect to FIG. 2. For example, as shown in FIG. 3B, bidirectional optical communication may be established between the first communicating device (350) and the second communicating device (355) by selectively moving the reflective body (315) at the intersection of the first optically conductive row (305-1) with the second optically conductive column (310-2) such that a) the optical output of the first communicating device is directed from point "A0$_o$" to point "B1$_i$", and b) the optical output of the second communicating device is directed from point "B1$_o$" to point "A0$_i$".

Previous electrical and optical crossbar interconnect configurations use single-sided mirrors to establish a single channel between a given column and a given row. Using this prior approach, a 4×4 crossbar interconnect is limited to four possible channels. However, as shown in FIGS. 3A-3B, the use of double-sided mirrors as reflective bodies (315) in the 4×4 crossbar optical interconnect (300) of the present example allows for two separate, simultaneous channels between any given column and row pair. Thus, the crossbar interconnect of the present example effectively doubles the efficiency of prior optical crossbar interconnects. This increased efficiency may result in a smaller physical footprint for the crossbar optical interconnect (300), thereby reducing the manufacturing cost and expense of operating the crossbar optical interconnect (300).

In certain examples, it may be desirable to connect a certain type of device to the optically conductive rows (305-1 to 305-4) and a different type of device to the optically conductive columns (310-1 to 310-4). For example, a server rack may include server devices and network switch devices, where the server devices communicate with network switches, but network switches do not communicate with other network switches, and server devices typically do not communicate with other server devices. In this example, each optically conductive row (305-1 to 305-4) may be coupled to a server device, and each optically conductive column (310-1 to 310-4) may be coupled to a switch device, such that only server-switch connections are made by the interconnect (300).

Figure 4A:
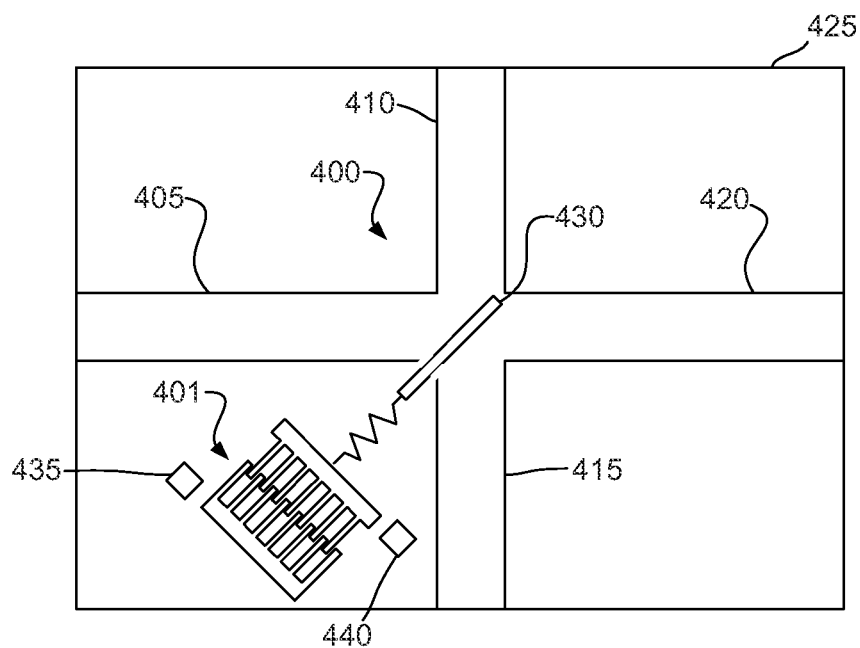
FIGS. 4A and 4B are diagrams of an illustrative cell in an optical interconnect crossbar, according to one example of principles described herein.
Figure 4B:
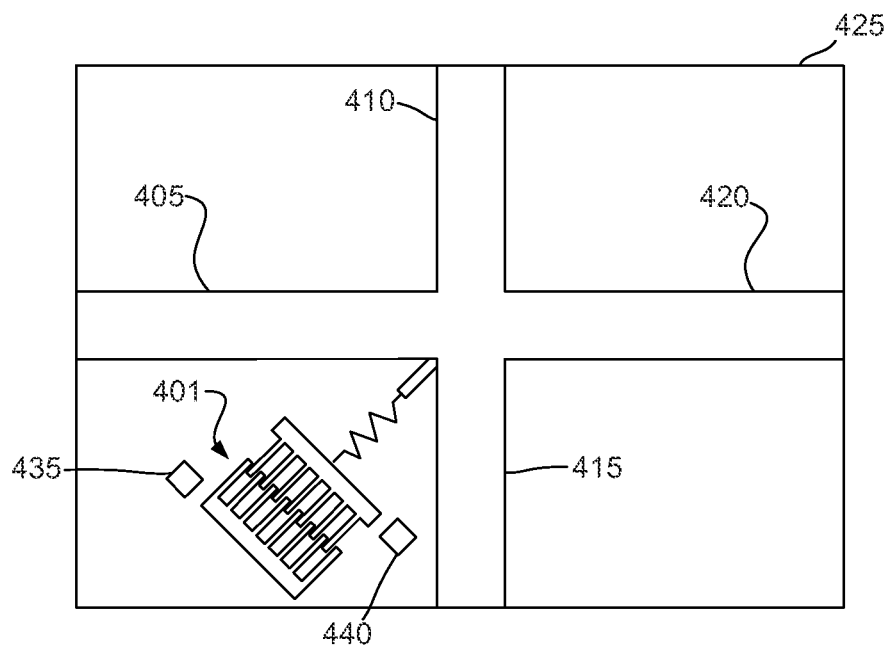

FIGS. 4A and 4B are diagrams showing top views of an illustrative bidirectional optical interconnect (400) with a MEMS actuator (401) for selectively enabling and disabling bidirectional optical communication between two devices. The optical interconnect (400) may be used as a standalone optical interconnect (400), such as that shown in FIG. 2, or as an individual cell of a crossbar interconnect, such as that shown in FIGS. 3A and 3B. As with the previously described interconnects, the optical interconnect (400) of the present example includes first, second, third, and fourth optical waveguides (405, 410, 415, 420) and a reflective body (430). The optical interconnect (400) may be fabricated on a substrate (425), such as a semiconductor substrate (425).

The first, second, third, and fourth optical waveguides (405, 410, 415, 420) of the present example are hollow metal waveguides (HMWG), and are joined together at a point of intersection. FIG. 4A shows a top view of the optical interconnect (400) with a top portion of the optical waveguides (405, 410, 415, 420) removed for illustrative purposes. FIG. 43 shows a top view of the optical interconnect (400) with the top portion of the optical waveguides (405, 410, 415, 420) in place. When the reflective body (430) is positioned to enable bidirectional optical communication, a first reflective surface of the reflective body (430) directs an optical wave emitted by the first optical waveguide (405) into the second optical waveguide (410), and a second reflective surface of the reflective body (430) directs an optical wave emitted by the third optical waveguide (415) into the fourth optical waveguide (420).

As shown in FIG. 4, the MEMS actuator (401) may be an electrostatic comb drive actuator mechanically coupled to the reflective body (430). By adjusting the voltage at two bias electrodes (435, 440) of the MEMS actuator (401), movement of the reflective body (430) may be controlled. Alternatively, the MEMS actuator (401) may be any other type of actuator that suits a particular application of the principles described herein. In certain examples, the MEMS actuator (401) may be a physical extension of the reflective body (430).

To establish bidirectional communication between two devices, a voltage difference may be applied between the first and second electrodes (435, 440) such that reflective body (430) is attracted to the second electrode (440) and brought into the position where it reflects optical waves between the waveguides (405, 410, 415, 420) as described above. To disable bidirectional communication between two devices, a voltage difference (or lack thereof) may be applied between the first and second electrodes (435, 440) such that a repelling force between the reflective body (430) and the second electrode (440) and/or a natural flexure of the MEMS actuator (401) causes the reflective body (430) to rise out of the optical path of the waveguides (405, 410, 415, 420).

Figure 5:
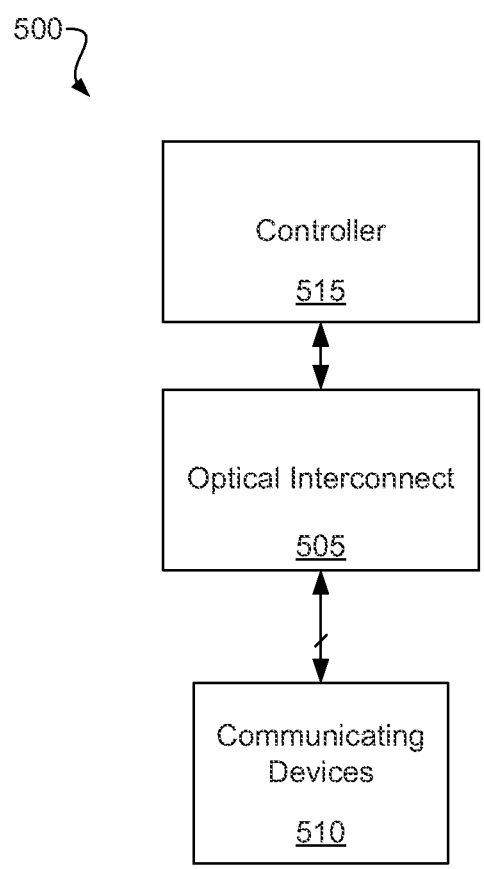
FIG. 5 is a block diagram of an illustrative optical interconnect, according to one example of principles described herein.

FIG. 5 is a block diagram of an illustrative system (500) of establishing bidirectional optical communication between two devices, consistent with the principles described above. The system (500) includes an optical interconnect (505), such as 1×1 optical interconnect (150) shown in FIG. 1 or the 4×4 optical interconnect (300) shown in FIGS. 3A-3B. The optical interconnect (505) is optically connected to two or more communicating devices (510). Each of the communicating devices (510) may be associated with either an optically conductive row or an optically conductive column in the optical interconnect (505).

Bidirectional optical communication may be established between a pair of these communicating devices (510) by selectively moving a reflective body at the intersection of a row and a column within the optical interconnect (505) according to the principles described above with respect to FIGS. 2-4. This selective movement of the reflective body may be accomplished using one or more control signals provided to the optical interconnect (505) by an electronic controller (515). The control signals may be provided by the electronic controller (515) automatically in response to a logical trigger or other automatic functionality implemented by the electronic controller (515). Additionally or alternatively, the electronic controller (515) may provide the control signals as directed by a user through manual input.

Figure 6:
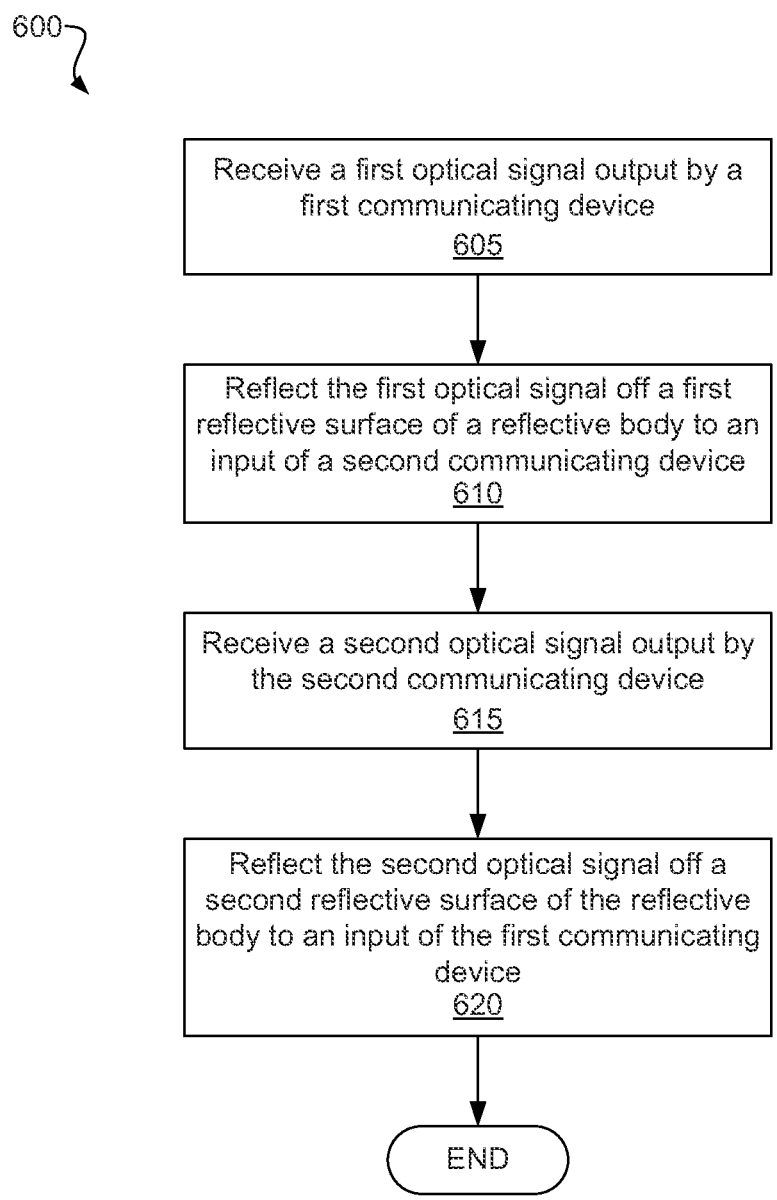
FIG. 6 is a flowchart diagram of an illustrative method of establishing bidirectional optical communication between a first device and a second device, according to one example of principles described herein.

FIG. 6 is a flowchart diagram of an illustrative method (600) of establishing bidirectional optical communication between two devices according to one example of the principles of the present specification.

In the illustrative method (600), a first optical signal output by a first communicating device is received (block 605) at an optical interconnect. The first optical signal is reflected (block 610) off a first reflective surface of a reflective body to an input of a second communicating device. A second optical signal output by the second communicating device is also received (block 615). The second optical signal is reflected (block 620) off a second reflective surface of the reflective body to an input of the first communicating device.

Figure 7:
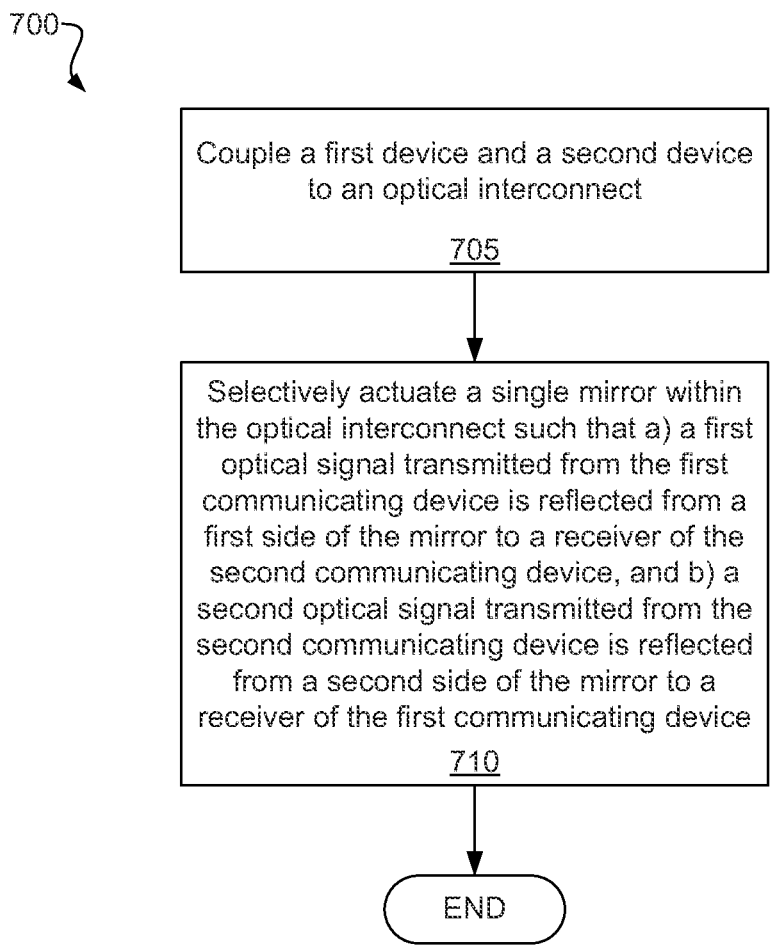
FIG. 7 is a flowchart diagram of an illustrative method of establishing bidirectional optical communication between a first device and a second device, according to one example of principles described herein.

FIG. 7 is a flowchart diagram of another illustrative method (700) of establishing bidirectional optical communication between two devices according to one example of the principles of the present specification.

In this illustrative method (700), a first device and a second device are both optically coupled (block 705) to an optical interconnect. Once the devices have been optically coupled to the optical interconnect, a single reflective body is selectively actuated (block 710) within the optical interconnect.

This actuation positions the reflective body such that a) a first optical signal transmitted from the first communicating device is reflected from a first side of the reflective body to a receiver of the second communicating device, and b) a second optical signal transmitted from the second communicating device is reflected from a second side of the reflective body to a receiver of the first communicating device.

In certain examples, the reflective body may be actuated to position the reflective body between a first optical waveguide, a second optical waveguide, a third optical waveguide, and a fourth optical waveguide, where the first and fourth optical waveguide make up an optically conductive row, and the second and third optical waveguide make up an optically conductive column. In certain examples, the first and second sides of the reflective body may correspond to first and second reflective surfaces of the reflective body. As such, the selective actuation of the reflective body may include selectively positioning the reflective body such that the first reflective side faces the first and second optical waveguides, and the second reflective side faces the third and fourth optical waveguides.

The preceding description has been presented only to illustrate and describe examples of the principles described. This description is not intended to be exhaustive or to limit these principles to any precise form disclosed. Many modifications and variations are possible in light of the above teaching.

What is claimed is:

1. An optical interconnect, comprising:
   a reflective body comprising a first reflective surface and a second reflective surface opposite said first reflective surface to establish bidirectional optical communication between a first communicating device and a second communicating device;
   a first optical waveguide that directs a first optical signal received from a first communicating device to said first reflective surface of said reflective body;
   a second optical waveguide that directs said first optical signal from said first reflective surface of said reflective body to a second communicating device;
   a third optical waveguide that directs a second optical signal received from said second communicating device to said second reflective surface of said reflective body; and
   a fourth optical waveguide that directs said second optical signal from said second reflective surface of said reflective body to said first communicating device;
   in which:
      the first optical waveguide and the fourth optical waveguide are coupled to an input and an output, respectively, of the first communicating device; and
      the second optical waveguide and the third optical waveguide are coupled to an input and an output, respectively, of the second communicating device.

2. The optical interconnect of claim 1, in which said reflective body is disposed obliquely with respect to said first optical waveguide, said second optical waveguide, said third optical waveguide, and said fourth optical waveguide.

3. The optical interconnect of claim 1, in which said first optical waveguide is substantially aligned with one of said third optical waveguide and said fourth optical waveguide; and in which said second optical waveguide is substantially aligned with the other of said third optical waveguide and said fourth optical waveguide.

4. The optical interconnect of claim 1, in which said reflective body is selectively movable into a position between said first optical waveguide, said second optical waveguide, said third optical waveguide, and said fourth optical waveguide.

5. The optical interconnect of claim 4, in which said reflective body is selectively movable using a microelectromechanical system (MEMS) actuator.

6. The optical interconnect of claim 5, in which said MEMS actuator is an electrostatic comb drive actuator.

7. The optical interconnect of claim 4, in which said reflective body is selectively movable into a position by adjusting an angle of said reflective body.

8. The optical interconnect of claim 1, in which said optical waveguides are arranged at right angles such that said first optical waveguide is aligned with said fourth optical waveguide and said second optical waveguide is aligned with said third optical waveguide.

9. The optical interconnect of claim 1, in which:
   said input and said output of said first communicating device are coupled to a single row of a plurality of optically conductive rows; and said input and said output of said second communicating device are coupled to a single column of a plurality of optically conductive columns.

10. An optical interconnect, comprising:
a plurality of optically conductive rows formed by a first plurality of optical waveguides;
a plurality of optically conductive columns formed by a second plurality of optical waveguides, said optically conductive rows forming a plurality of intersecting optical paths with said plurality of optically conductive columns;
a controller for establishing bidirectional optical communication between a first device optically coupled to a first end and a second end of a first said optically conductive row with a second device optically coupled to a first end and a second end of a first said optically conductive column by selectively moving a reflective body disposed at an intersection of said first optically conductive column and said first optically conductive row.

11. The optical interconnect of claim 10, in which said reflective body comprises a first reflective side and a second reflective side opposite to said first reflective side.

12. The optical interconnect of claim 10, in which each intersection of a said optically conductive column and a said optically conductive row comprises a selectively movable reflective body.

13. The optical interconnect of claim 10, in said first end of said first optically conductive row is communicatively coupled to an optical transmitter of said first device, and said second end of said first optically conductive row is communicatively coupled to an optical receiver of said first device.

14. The optical interconnect of claim 10, in which said controller selectively moves said reflective body by selectively engaging a microelectromechanical system (MEMS) actuator coupled to said reflective body.

15. A method of establishing bidirectional optical communication between a first device and a second device, said method comprising:
coupling said first device and said second device to an optical interconnect comprising a reflective body by:
coupling an input and an output of said first device to a first waveguide and a fourth waveguide, respectively; and
coupling an input and an output of said second device to a second waveguide and a third waveguide, respectively; and
selectively actuating said reflective body such that a) a first optical signal transmitted from said first device is reflected from a first side of said reflective body to a receiver of said second device, and b) a second optical signal transmitted from said second device is reflected from a second side of said reflective body to a receiver of said first device.

16. The method of claim 12, in which selectively actuating said reflective body comprises selectively engaging a microelectromechanical system (MEMS) actuator communicatively coupled to said reflective body to move said reflective body into a set position.

17. The method of claim 15, in which:
a transmitter of said first device is communicatively coupled to a first optical waveguide, said receiver of said second device is communicatively coupled to a second optical waveguide, a transmitter of said second device is communicatively coupled to a third optical waveguide, and said receiver of said first device is communicatively coupled to a fourth waveguide; and
said first optical waveguide and said fourth optical waveguide are perpendicular to said second optical waveguide and said third optical waveguide.

18. The method of claim 17, in which selectively actuating said reflective body comprises selectively positioning said reflective body between said first, second, third, and fourth optical waveguides.

19. The method of claim 18, in which:
said reflective body comprises a first reflective side and a second reflective side (240); and
selectively actuating said reflective body comprises selectively positioning said reflective body such that said first reflective side faces said first optical waveguide and said second waveguide, and said second reflective side faces said third optical waveguide and said fourth optical waveguide.

20. The method of claim 19, in which:
said first optical waveguide and said fourth optical waveguide form an optically conductive row of a plurality of optically conductive rows; and
said second optical waveguide and said third optical waveguide form an optically conductive column of a plurality of optically conductive columns.

* * * * *